March 31, 1936.  C. B. WILLIAMS, JR  2,035,580
CUTTING MACHINE
Filed Jan. 25, 1935  3 Sheets-Sheet 1
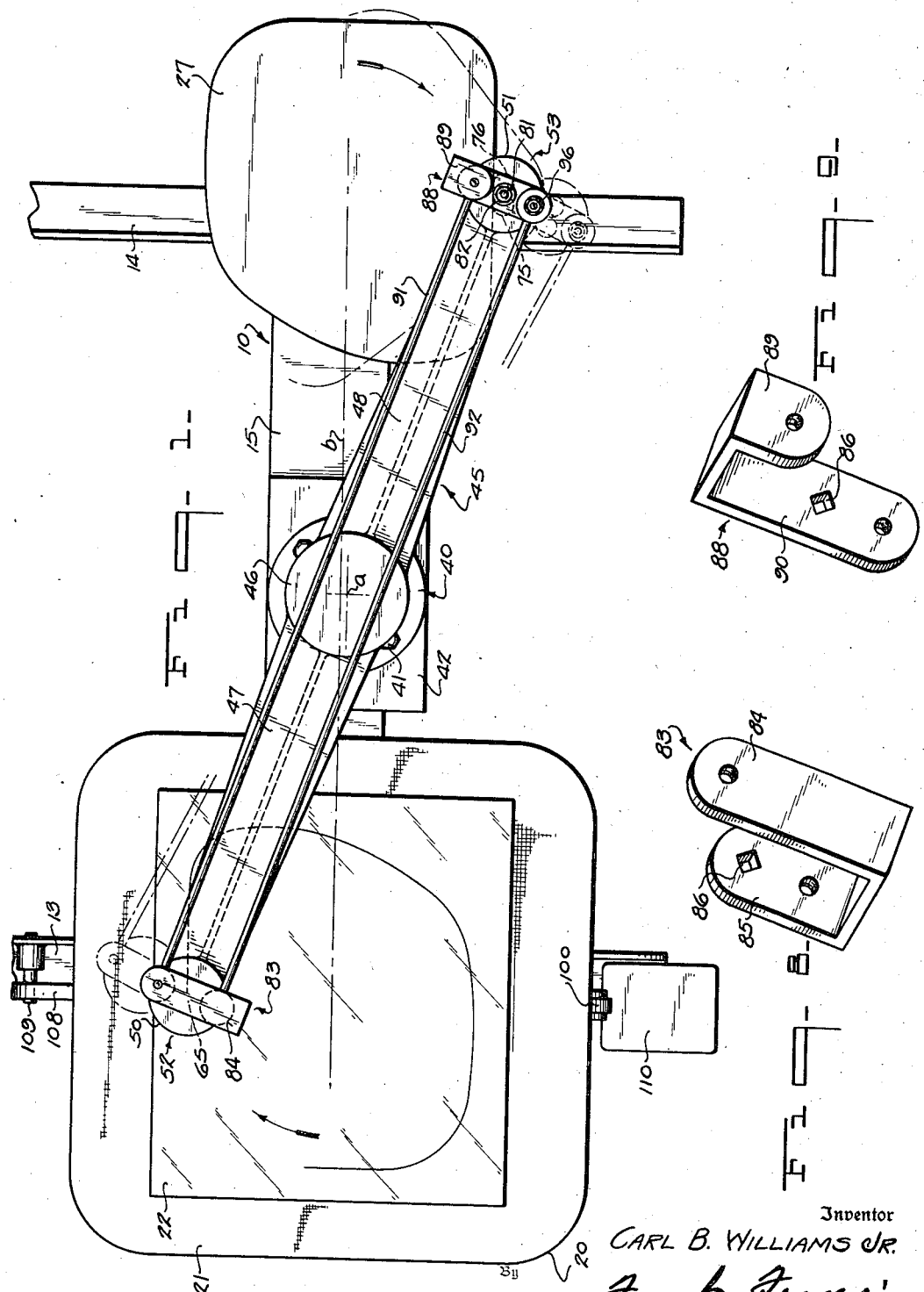
Inventor
CARL B. WILLIAMS JR.
Frank Fraser
Attorney

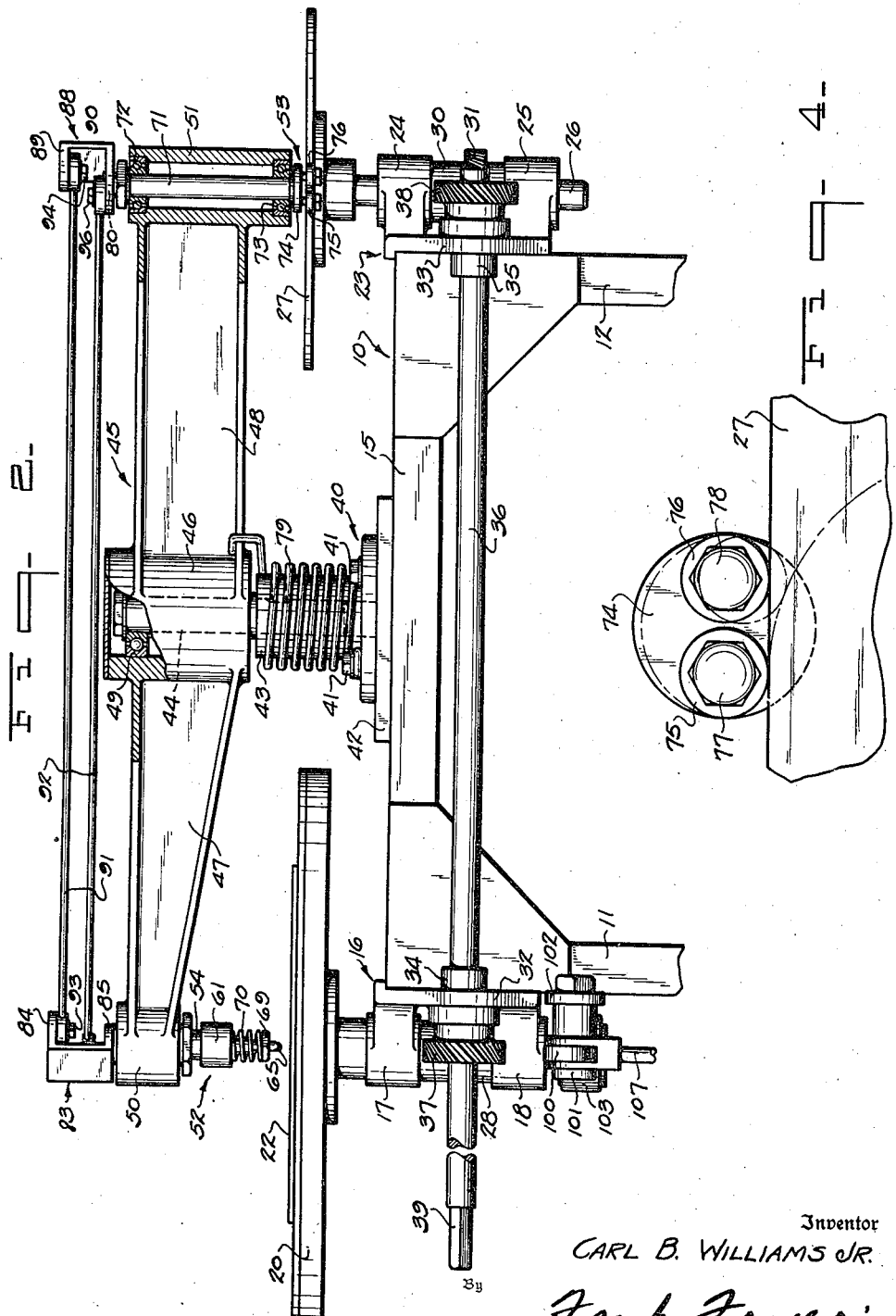

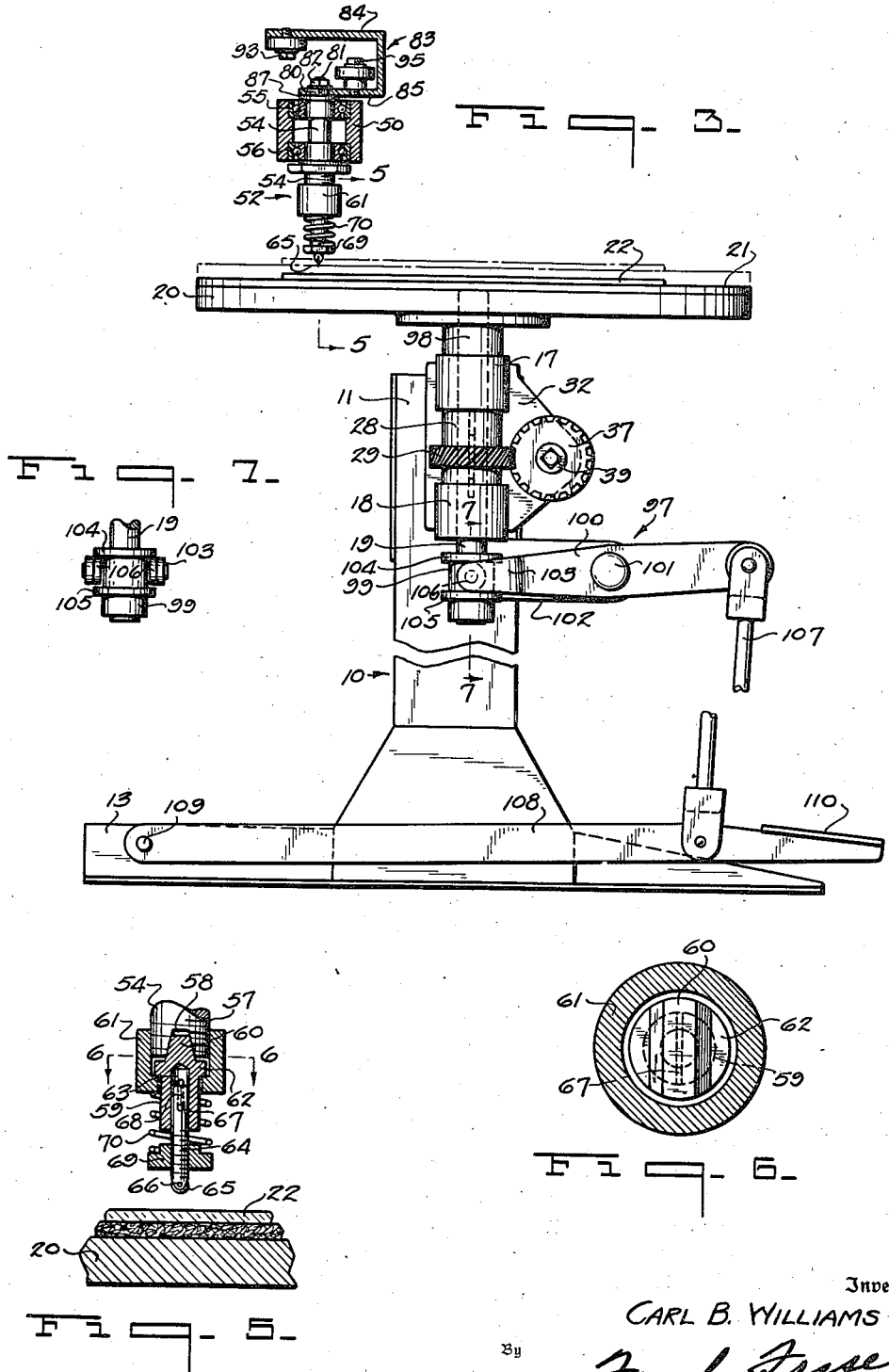

Patented Mar. 31, 1936

2,035,580

UNITED STATES PATENT OFFICE 2,035,580

CUTTING MACHINE

Carl B. Williams, Jr., Toledo, Ohio, assignor to Libbey-Owens-Ford Glass Company, Toledo, Ohio, a corporation of Ohio Application January 25, 1935, Serial No. 3,496

14 Claims. (Cl. 33—27)

The present invention relates to improvements in cutting machines generally and more particularly to a machine designed primarily for the cutting of glass sheets or plates, although it is of course not restricted to such use.

An important object of the invention is to provide a cutting machine for cutting out from glass sheets or plates forms or sections of regular or irregular outline rapidly, accurately, and economically.

Another object of the invention is the provision of a cutting machine of the above character embodying a rotatable support for the sheet to be cut and a rotatable template of a predetermined shape and size, together with tracer means associated with said template and operatively connected with a cutting tool in such a manner that, upon proper rotation of the support and template, the said tool will cut a faithful and accurate reproduction of the shape of said template.

A further object of the invention is the provision of a cutting machine of the above character wherein the tracer means and cutting tool are operatively connected together in such a manner that the cutting edge of the cutting tool will always be maintained in a line tangent to that of the cut whereby the shape of the template will be accurately transferred to the cut sheet.

Other objects and advantages will become more apparent during the course of the following description when taken in connection with the accompanying drawings.

In the drawings wherein like numerals are employed to designate like parts throughout the same, Fig. 1 is a plan view of a cutting machine constructed in accordance with the present invention, Fig. 2 is a side elevation, partially in section, of the machine illustrated in Fig. 1, Fig. 3 is an end view thereof, partially in section, Fig. 4 is a bottom view of the tracer means and a portion of the template or pattern member, Fig. 5 is a vertical section taken substantially on line 5—5 of Fig. 3, Fig. 6 is a horizontal section taken substantially on line 6—6 of Fig. 5, Fig. 7 is a detail section taken substantially on line 7—7 in Fig. 3, and Figs. 8 and 9 are perspective views of the brackets forming a portion of the connecting means between the cutting unit and tracer means.

Referring now more particularly to the drawings, the cutting machine illustrated therein and embodying the present invention includes a supporting framework designated in its entirety by the numeral 10. This framework comprises a pair of spaced vertical end members 11 and 12 mounted upon the base portions 13 and 14 respectively and connected together at their upper ends by the horizontal top member 15. Mounted upon the framework 10 at one end thereof is a bearing bracket 16 which includes a pair of spaced, vertically aligned bearings 17 and 18 within which is rotatably and slidably journaled a vertical shaft 19. Rigidly secured to the upper end of this shaft is a horizontal support or table 20 having a substantially flat upper surface 21 preferably covered with felt or the like and upon which is adapted to be received a sheet of glass 22 to be cut.

Mounted at the opposite end of the framework 10 is a second bearing bracket 23 including spaced vertically aligned bearings 24 and 25 within which is journaled a vertical shaft 26. Removably secured to the upper end of this shaft is a horizontally arranged template or pattern member 27, here shown as being in the form of a flat plate of substantially the same size and shape as the section to be cut from the glass sheet.

In accordance with the present invention, to insure an accurate reproduction of the shape of the template being cut from the glass sheet, it is important that the table 20 and the template 27 be caused to rotate simultaneously and in timed relation to one another. To this end, a sleeve 28, carrying a spiral gear 29, is slidably keyed to the vertical shaft 19 between the bearings 17 and 18 of the bracket 16. A similar sleeve 30 carrying a spiral gear 31 is positioned between the bearings 24 and 25 of bracket 23 and is keyed to the vertical shaft 26.

The bearing brackets 16 and 23 are preferably formed with lateral extensions 32 and 33 provided with the horizontally aligned bearings 34 and 35, within which a line shaft 36 may be suitably journaled. Keyed to the line shaft 36 are spiral gears 37 and 38 adapted to mesh with the spiral gears 29 and 31 on the vertical shafts 19 and 26 respectively. The desired rotation of the shaft 36 may be effected by any suitable means, said shaft being here shown as provided with a squared end 39 for receiving a hand crank. Since the gears 29 and 31 and the gears 37 and 38 are of the same relative proportions, the table 20 and the template 27 will be caused to rotate simultaneously and at the same speed upon turning of the shaft 36.

Positioned between the sheet supporting table 20 and the template 27 is a stationary supporting member 40, secured by bolts or the like 41 to a plate 42 mounted upon the member 15 of the framework 10. The supporting member 40 includes an upwardly extending boss 43 having a central opening suitably drilled or tapped therein to receive and rigidly support the lower end of a vertical pin or post 44. A horizontal bar or other supporting member 45 is arranged above the table 20 and the template 27 and is pivotally mounted intermediate its ends on the pin 44. The supporting member 45 comprises a hub or bearing portion 46 provided with a pair of horizontally aligned arms 47 and 48. The hub 46 is adapted to receive the upper end of the pin 44 and is preferably provided with suitable ball bearing assemblies as at 49 to facilitate swinging action of the supporting member. The arms 47 and 48 are provided adjacent their outer ends with bearings 50 and 51 respectively, the bearing 50 being adapted to carry a cutter unit 52 and the bearing 51 the tracer means 53.

The cutting unit 52 includes a vertical shaft 54 journaled in the ball bearing assemblies 55 and 56 which are mounted within the bearing 50. The shaft 54 projects downwardly beyond the bearing 50 and is externally threaded as at 57, said shaft being also provided with a recess 58 in its lower end. The numeral 59 designates a cylindrical cutter support formed at its upper end with a tapered head 60 which is received within the recess 58 whereby to prevent turning of the said cutter support relative to the shaft 54. The cutter support is held in place by a collar 61 threaded upon the lower end of shaft 54 and engaging an annular flange 62 formed on said cutter support.

The cutter support 59 is also provided with a vertical elongated recess 63 within which is slidably received the cutter holder 64 carrying at its lower end the freely rotatable steel cutting wheel 65 mounted on a horizontal pin 66. The cutter holder is permitted a limited amount of vertical sliding movement within the cutter support by means of a transverse pin 67 carried by said holder and operating through vertical slots 68 in said support. Threaded upon the cutter holder, adjacent its lower end, is a nut 69 and interposed between the said nut 69 and the collar 61 is a compression spring 70 which acts to yieldably maintain the cutting wheel 65 in engagement with the glass.

The tracer means 53 includes a vertical shaft 71 journaled in the ball bearing assemblies 72 and 73 arranged within the bearing 51. The lower end of the shaft 71 projects slightly below the bearing 50 and is provided with a circular plate or disc 74 adapted to carry a pair of freely rotatable guide rollers 75 and 76 secured to the lower face thereof by bolts 77 and 78. The guide rollers 75 and 76 are spaced equidistant from the axis of rotation of the shaft 71 and are in diametrical alignment with one another, said rollers being adapted to continuously engage the edge portion of the template 27 at two spaced points (Fig. 4). In order to maintain this two point contact during rotation of the template, there is provided a coil spring 79 encircling the boss 43 of the supporting member 40 and having one end secured to one of the bolts 41 while the opposite end bears against the outer side of the arm 48 of the supporting member 45.

As pointed out above, the movement of the tracer means is adapted to be imparted to the cutting unit in such a manner that the cutting tool will reproduce and cut out from the glass sheet a form or section having the same shape as that of the template. Although the cut sheet will always be of exactly the same shape as the template, the relative size thereof will depend on the design of the cutting machine and the particular arrangement of its parts. For example, with the machine illustrated in the drawings, an exact duplicate of the template, both as to size and shape will be reproduced. To this end, the cutting tool shaft 54 and the tracer means shaft 71 are equidistantly spaced from the center of the hub 46 and the hub in turn is positioned with its center equidistant from the axes of rotation of the support 20 and template 27.

When the tracer means 53 is in engagement with the template, the center of the shaft 71 is spaced from the edge of the template a distance equal to the diameters of the guide rollers 75 and 76. In order to compensate for this, the center $a$ of the hub 46 may be positioned to one side of a line $b$ connecting the axes of rotation of the support and template. If desired, a similar result may be attained with the center of the hub in alignment with the axes of rotation of the support and template by using a template that is slightly smaller than the section of glass to be cut.

Thus, the location of the cutting wheel 65 on the glass sheet, relative to the axis of rotation of the support, will be controlled by the position of the tracer means 53 relative to the axis of rotation of the template. In other words, with the guide rollers engaging the template, the tracer means 53 and the cutting wheel 65 will be on opposite sides of a common center line $b$ of the support and template. However, the position taken by the cutting wheel, relative to the axis of rotation of the support 20, will always be the same as that of a point on the edge of the template 27 midway between the guide rollers 75 and 76, relative to the axis of rotation of the template. With this arrangement any bodily movement of the tracer means will be transmitted to the cutting tool through the pivoted supporting member 45 to cause a corresponding movement of said cutting tool but in an opposite direction.

Upon turning of the shaft 36 the support 20 will be rotated to provide relative movement between the glass sheet 22 and the cutting tool 65 and simultaneously the template 27 will be rotated at the same speed. The guide rollers 75 and 76 will ride freely over the moving edge of the template and the varying contour of said template will cause the tracer means to move bodily with or against the action of the spring 79. This bodily movement of the tracer means, induced by the shape of the template, will be accurately transmitted to the cutting tool to properly position it at every point along the line of cut. As clearly shown in Fig. 1, upon a complete rotation of the support 20 and the template 27, the cutting tool will reproduce and cut out a section from the glass sheet 22 that is the same shape and size as the template 27 but with its outline reversed.

In order to effect proper cutting of the glass sheet in this manner, it is of great importance that the cutting wheel 65 be always maintained in a line tangent to that of the cut, especially when there is a sudden change in the contour of the template. To this end, the present invention embodies the provision of means for causing the rotary movements of the tracer means to be accurately transmitted to the cutting wheel. In the embodiment illustrated, the shaft 54 of the cutting unit extends upwardly beyond the bearing 50 and is provided adjacent its upper end with the squared portion 80 terminating in the reduced threaded portion 81 upon which is threaded a nut 82. Mounted upon the upper end of the shaft 54 is a horizontally disposed, substantially U-shaped bracket 83 including upper and lower legs 84 and 85, with the upper leg being relatively longer than the lower leg. The squared portion 80 of the shaft 54 is adapted to be received within a square opening 86 formed in the lower leg 85 of the bracket 82 (Fig. 6), with the said leg being clamped firmly to the shaft between a lateral flange 87 formed on said shaft and the nut 82.

Secured to the upper end of the vertical shaft 71 of the tracer means in a manner similar to that in which the bracket 83 is secured to the shaft 54 is a second horizontally disposed, substantially U-shaped bracket 88 having a relatively short upper leg 89 and a somewhat longer lower leg 90. The brackets 82 and 88 are operatively connected together by the parallel rods 91 and 92 equidistantly spaced to either side of a straight line connecting the axes of rotation of the shafts 71 and 54. The rod 91 is pivotally secured at its opposite ends to the upper legs 84 and 89 of the brackets 82 and 88 respectively by means of the bolts 93 and 94, while the opposite ends of the rod 92 are pivotally connected to the lower legs 85 and 90 by the bolts 95 and 96. With this arrangement, it will be seen that upon turning of the tracer shaft 71 exactly the same rotary movement will be transmitted to the cutter shaft 54 through the brackets 82 and 88 and the rods 91 and 92. This results in the cutting wheel being always maintained in a line tangent to the line of cut and permits relatively sharp or small radius curves to be executed as readily as large radius curves.

To facilitate the placing of the glass sheets to be cut upon the table 20 and their subsequent removal therefrom, it is desirable that the upper or sheet supporting surface 21 of the said table be normally positioned somewhat below the lower limit of the vertical movement of the cutting wheel 65, as shown in full lines in Figs. 2 and 3. The table 20 is adapted to be raised to bring the sheet 21 into engagement with the cutting wheel 65 and to be maintained in this position, during the cutting operation, by means of a suitable foot controlled elevating mechanism 97 associated with the lower end of the vertical shaft 19 which, as pointed out above, is slidably journaled in the bearings 17 and 18 and carries at its upper end the work table 20. The downward movement of the shaft 19 is limited by a flanged collar 98, carried adjacent the upper end of said shaft and adapted to engage the bearing 17, while the upward movement of the shaft is limited by a second flanged collar 99 fixed to said shaft adjacent its lower end and adapted to engage the bearing 18.

The elevating mechanism 97 comprises a lever arm 100 pivotally mounted intermediate its ends upon a pin 101 carried at the outer end of a bracket 102 fixed to the framework 10. The inner end of the lever arm 100 is bifurcated as at 103 to embrace the flanged collar 98 between the annular flanges 104 and 105 formed thereon. Carried by the inner surfaces of the bifurcated portions 103 are the bosses or rollers 106 which are adapted to engage the upper flange 104 of the collar 98 without affecting the free rotation of the shaft 19. The opposite end of the lever arm 100 is connected, by suitable linkage 107 to a treadle or foot lever 108. This lever is pivotally mounted at one end to the base portion 13 as at 109 and is provided at its opposite end, outwardly of the linkage means 107, with a foot plate or the like 110. Upon depression of the floating end of the lever 108 by the operator, the elevating mechanism 97 will act through the linkage means 107 and lever 100, associated with the lower end of the shaft 19, to raise the table 20 into cutting position as shown in broken lines in Fig. 3.

In operation, a sheet of glass 22 to be cut is properly positioned upon the table 20 while in lowered position and a template 27 of the desired shape and size is mounted upon the upper end of the shaft 26. The operator then depresses the floating end of the treadle 108 to effect the raising of said table and to bring the glass sheet into contact with the cutting wheel 65 which will be yieldingly pressed upon the glass by the action of the compression spring 70. Power is then applied to the shaft 36 to rotate the table 20 and template 27 simultaneously and at equal speed through the spiral gears 37 and 38 meshing with spiral gears 29 and 31. This rotary movement of the table 20 will provide relative movement between the glass sheet 22 and the cutting wheel 65 while the rotation of the template 27 acting through the tracer means 53 and the pivoted bar 45 will properly position said cutting wheel to cause it to cut an accurate reproduction of the template contour. As the guide rollers 75 and 76 of the tracer means follow the curved edge of the template, the shaft 71 will be rotated about its axis and exactly the same degree of rotation will be transmitted to the cutting unit as explained above.

With the machine herein provided, sections of circular, elliptical, or irregular outline can be rapidly, accurately, and economically cut out from the glass sheets or plates. Furthermore, since the accuracy of the cut is not dependent upon the skill of the operator, the machine can be successfully operated with relatively unskilled workmen.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass cutting apparatus, a rotatable support for the sheet to be cut, a rotatable template, a swingably mounted supporting member positioned above said support and template, a cutting unit including a cutting tool rotatably carried by said supporting member, tracer means also rotatably carried by the supporting member and adapted to engage said template, means for rotating said support and template in timed relation to each other to effect swinging movement of said supporting member, and means connecting said tracer means and cutting tool for transmitting rotary movement of the former to the latter.

2. In sheet glass cutting apparatus, a rotatable support for the sheet to be cut, a rotatable template, a supporting member positioned above said support and template and mounted to swing in the plane of the sheet, a cutting unit including a cutting tool rotatably carried by said supporting member, tracer means also rotatably carried by the supporting member and adapted to engage said template, means for rotating said support and template simultaneously and in timed relation to each other to effect swinging movement of said supporting member, means for yieldably maintaining the tracer means in engagement with said template, and means connecting said tracer means and cutting tool for transmitting rotary movement of the former to the latter.

3. In sheet glass cutting apparatus, a rotatable support for the sheet to be cut, a rotatable template, a supporting member positioned above said support and template and mounted to swing in the plane of the sheet, a cutting unit including a cutting tool rotatably carried by said supporting member, tracer means also rotatably carried by said supporting member and including a plurality of guide rollers adapted to engage said template, spring means engaging the supporting member for yieldably maintaining said guide rollers in engagement with said template, means for rotating said support and template simultaneously and in timed relation to each other to effect swinging movement of said supporting member, and means connecting said tracer means and cutting tool for transmitting rotary movement of the former to the latter.

4. In sheet glass cutting apparatus, a rotatable support for the sheet to be cut, a rotatable template, a supporting member positioned above said support and template and pivotally mounted intermediate its ends, a cutting unit rotatably carried at one end of said supporting member and including a cutting tool, tracer means rotatably carried at the opposite end of the supporting member and adapted to engage said template, means for rotating said support and template simultaneously and in timed relation to each other to effect pivotal movement of said supporting member, and means connecting said tracer means and cutting unit for transmitting rotary movement of the former to the latter.

5. In sheet glass cutting apparatus, a rotatable support for the sheet to be cut, a rotatable template, a supporting member positioned above said support and template and pivotally mounted intermediate its ends, a cutting unit rotatably carried at one end of said supporting member and including a cutting tool, tracer means rotatably carried at the opposite end of the supporting member and including a plurality of guide rollers adapted to engage said template, means for yieldably urging said guide rollers toward and maintaining them in engagement with the template, means for rotating said support and template in timed relation to each other to effect pivotal movement of said supporting member, and means connecting said tracer means and cutting unit for transmitting rotary movement of the former to the latter.

6. In sheet glass cutting apparatus, a rotatable support for the sheet to be cut, a rotatable template, a supporting member positioned above said support and template and pivotally mounted intermediate its ends, a vertical shaft rotatably carried at one end of said supporting member, a cutting tool carried by said shaft, a second vertical shaft rotatably carried at the opposite end of the supporting member, tracer means carried by said second shaft and adapted to engage said template, means for rotating said support and template in timed relation to each other to effect pivotal movement of said supporting member, and means connecting said first and second named shafts for transmitting rotary movement of the tracer means to the cutting unit.

7. In sheet glass cutting apparatus, a rotatable support for the sheet to be cut, a rotatable template, a supporting member positioned above said support and template and pivotally mounted intermediate its ends, a vertical shaft rotatably carried at one end of said supporting member, a cutting tool carried by said shaft, a second vertical shaft rotatably carried at the opposite end of the supporting member, tracer means carried by said second shaft and including a plurality of guide rollers adapted to engage said template, means for yieldably urging said guide rollers toward and maintaining them in engagement with the template, means for rotating said support and template simultaneously and in timed relation to each other to effect pivotal movement of said supporting member, and means connecting said first and second named shafts for transmitting rotary movement of the tracer means to the cutting unit.

8. In sheet glass cutting apparatus, a rotatable support for the sheet to be cut, a rotatable template, a supporting member positioned above said support and template and pivotally mounted intermediate its ends, a vertical shaft rotatably carried at one end of said supporting member, a cutting tool carried by said shaft, a second vertical shaft rotatably carried at the opposite end of the supporting member, tracer means carried by said second shaft and adapted to engage said template, a bracket carried by each of said vertical shafts, a plurality of rods connecting said brackets so that rotary movement of the tracer means shaft will effect a corresponding rotation of the cutting tool shaft, and means for rotating said support and template in timed relation to each other to effect pivotal movement of said supporting member.

9. In sheet glass cutting apparatus, a rotatable support for the sheet to be cut, a rotatable template, a supporting member positioned above said support and template and pivotally mounted intermediate its ends, a vertical shaft rotatably carried at one end of said supporting member, a cutting tool carried by said shaft, a second vertical shaft rotatably carried at the opposite end of the supporting member, tracer means carried by said second shaft and including a plurality of guide rollers adapted to engage said template, means for yieldably urging said guide rollers toward and maintaining them in engagement with the template, a bracket carried by each of the vertical shafts, a pair of rods positioned at opposite sides of said vertical shafts and connecting said brackets so that rotary movement of the tracer means shaft will effect a corresponding rotation of the cutting tool shaft, and means for rotating said support and template simultaneously and in timed relation to each other to effect pivotal movement of said supporting member.

10. In sheet glass cutting apparatus, a rotatable table for the sheet to be cut which is normally maintained out of cutting position, a rotatable template, a supporting member positioned above said table and template and pivotally mounted intermediate its ends, a cutting unit carried at one end of said supporting member and including a cutting tool, tracer means carried at the opposite end of the supporting member and adapted to engage said template, means for moving the table into cutting position, and means for rotating said table and template in timed relation to each other to effect pivotal movement of said supporting member.

11. In sheet glass cutting apparatus, a rotatable table for the sheet to be cut movable into and out of cutting position, a rotatable template, a supporting member positioned above said table and template and pivotally mounted intermediate its ends, a cutting unit carried at one end of said supporting member and including a cutting tool, tracer means carried at the opposite end of the supporting member and including a plurality of guide rollers adapted to engage said template, means for yieldably urging said guide rollers toward and maintaining them in engagement with the template, means for moving the rotatable table into cutting position, means for rotating said table and template simultaneously and in timed relation to each other to effect pivotal movement of said supporting member, and means connecting said tracer means and cutting unit for transmitting rotary movement of the former to the latter.

12. In sheet glass cutting apparatus, a rotatable support for the sheet to be cut, a rotatable template, a swingably mounted supporting member positioned above said support and template, a cutting unit including a cutting tool rotatably carried by said supporting member, tracer means also rotatably carried by the supporting member and engaging said template at a plurality of spaced points along the periphery thereof, means for rotating said support and template in timed relation to each other to effect swinging movement of said supporting member, and means connecting said tracer means and cutting tool for transmitting rotary movement of the former to the latter.

13. In sheet glass cutting apparatus, a rotatable support for the sheet to be cut, a rotatable template, a swingably mounted supporting member positioned above said support and template, a cutting unit including a cutting tool rotatably carried by said supporting member, tracer means also rotatably carried by the supporting member and engaging said template at two spaced points along the periphery thereof equidistant from the axis of rotation of the tracer means, means for rotating said support and template in timed relation to each other to effect swinging movement of said supporting member and means connecting said tracer means and cutting tool for transmitting rotary movement of the former to the latter.

14. In sheet glass cutting apparatus, a rotatable support for the sheet to be cut, a rotatable template, a swingably mounted supporting member positioned above said support and template, a cutting unit including a cutting tool rotatably carried by said supporting member, tracer means also rotatably carried by the supporting member and including a plurality of guide rollers engageable with said template, means for rotating said support and template in timed relation to each other to effect swinging movement of said supporting member, and means connecting said tracer means and cutting tool for transmitting rotary movement of the former to the latter.

CARL B. WILLIAMS, Jr.